(12) United States Patent
Nemoto

(10) Patent No.: US 10,407,094 B2
(45) Date of Patent: Sep. 10, 2019

(54) ELECTRIC POWER STEERING DEVICE AND METHOD FOR ASSEMBLING THE SAME

(71) Applicant: NSK LTD., Tokyo (JP)

(72) Inventor: Tatsurou Nemoto, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/772,407

(22) PCT Filed: Nov. 10, 2016

(86) PCT No.: PCT/JP2016/083397
§ 371 (c)(1),
(2) Date: Apr. 30, 2018

(87) PCT Pub. No.: WO2017/082355
PCT Pub. Date: May 18, 2017

(65) Prior Publication Data
US 2018/0327024 A1 Nov. 15, 2018

(30) Foreign Application Priority Data

Nov. 13, 2015 (JP) ................................. 2015-222616

(51) Int. Cl.
| | |
|---|---|
| *B62D 5/04* | (2006.01) |
| *B62D 6/10* | (2006.01) |
| *G01L 5/22* | (2006.01) |

(52) U.S. Cl.
CPC ............ *B62D 6/10* (2013.01); *B62D 5/0409* (2013.01); *B62D 5/0463* (2013.01); *G01L 5/221* (2013.01)

(58) Field of Classification Search
CPC ....... B62D 5/0409; B62D 5/0463; B62D 6/10
See application file for complete search history.

(56) References Cited

U.S. PATENT DOCUMENTS

| | | | |
|---|---|---|---|
| 6,328,128 B1 * | 12/2001 | Chikaraishi | B62D 5/049 180/443 |
| 7,357,216 B2 * | 4/2008 | Ishii | B62D 3/123 180/444 |

(Continued)

FOREIGN PATENT DOCUMENTS

| | | |
|---|---|---|
| CN | 103597229 A | 2/2014 |
| DE | 11 2008 002 486 T5 | 10/2010 |

(Continued)

OTHER PUBLICATIONS

Communication dated Oct. 1, 2018, from the European Patent Office in counterpart European Application No. 16864316.1.

(Continued)

*Primary Examiner* — Kevin Hurley
(74) *Attorney, Agent, or Firm* — Sughrue Mion, PLLC

(57) ABSTRACT

A first connecting part of a torsion bar is connected to a spline hole of a lower shaft, once the proximal end part of a torque-detecting sleeve has been externally fitted on and secured to a cylindrical part provided on the lower shaft, a second connecting shaft part of the torsion bar is inserted from the trailing end side into the inner side of an output shaft. When the lower shaft and the output shaft get closer to each other in the axial direction, the leading end part of a guide shaft part is advanced into the inner-diameter side of the trailing end part of a bush prior to the leading end part of the torque-detecting sleeve being advanced to the outer-diameter side of a part having protrusions and recesses for detecting torque.

4 Claims, 10 Drawing Sheets

(56) References Cited

U.S. PATENT DOCUMENTS

| | | | |
|---|---|---|---|
| 10,005,490 B2 * | 6/2018 | Unno | G01L 5/221 |
| 2005/0257991 A1 | 11/2005 | Ishii et al. | |
| 2008/0035413 A1 | 2/2008 | Segawa et al. | |
| 2010/0331093 A1 | 12/2010 | Ozawa et al. | |
| 2013/0334870 A1 | 12/2013 | Ozawa et al. | |
| 2014/0190762 A1 | 7/2014 | Kiyota et al. | |
| 2015/0175198 A1 | 6/2015 | Shigeta | |

FOREIGN PATENT DOCUMENTS

| | | | |
|---|---|---|---|
| JP | 2001-88719 A | 4/2001 |
| JP | 2005-255121 A | 9/2005 |
| JP | 2008-179248 A | 8/2008 |
| JP | 2011-136652 A | 7/2011 |
| JP | 2013-71590 A | 4/2013 |
| JP | 2015-101237 A | 6/2015 |
| WO | 2006/043669 A1 | 4/2006 |
| WO | 2014/199959 A1 | 12/2014 |

OTHER PUBLICATIONS

Search Report dated Jan. 31, 2017, issued by the International Searching Authority in counterpart International Patent Application No. PCT/JP2016/083397 (PCT/ISA/210).
Written Opinion dated Jan. 31, 2017, issued by the International Searching Authority in counterpart International Patent Application No. PCT/JP2016/083397 (PCT/ISA/237).
Office Action dated May 23, 2019 by the State Intellectual Property Office of P.R. China in counterpart Chinese Patent Application No. 201680063710.6.

* cited by examiner

ELECTRIC POWER STEERING DEVICE AND METHOD FOR ASSEMBLING THE SAME

TECHNICAL FIELD

The present invention relates to an improvement on an electric power steering device (EPS) to be used as an automobile steering device and configured to reduce a force, which is necessary to operate a steering wheel, by using an electric motor as an auxiliary power source, and a method for assembling the same.

BACKGROUND ART

FIGS. 8 to 10 illustrate an example of a conventional structure of an electric power steering device disclosed in Patent Document 1. The electric power steering device is configured to transmit rotation of a steering wheel 1 to an input shaft 3 of a steering gear unit 2 and to push and pull a pair of left and right tie-rods 4, 4 in association with rotation of the input shaft 3, thereby applying a steering angle to wheels. The steering wheel 1 is supported and fixed to a rear end portion of a steering shaft 5. The steering shaft 5 is rotatably supported to a cylindrical steering column 6 supported to a vehicle body with being inserted in the steering column 6 in an axial direction. A front end portion of the steering shaft 5 is connected to a rear end portion of an intermediate shaft 8 via a universal joint 7. A front end portion of the intermediate shaft 8 is connected to the input shaft 3 via a separate universal joint 9. The illustrated example is an electric power steering device configured to reduce a force, which is necessary to operate the steering wheel 1, by using an electric motor 10 as a generation source of auxiliary power. Meanwhile, in the specification, a front-rear direction refers to a front-rear direction of a vehicle, unless particularly mentioned.

The steering column 6 is configured by combining an inner column 11 and an outer column 12 so as to be expandable and contractible. The steering column 6 is supported to the vehicle body (not shown). The steering shaft 5 is configured by combining a lower shaft 13 corresponding to an input shaft in the claims and an upper shaft 14 such that torque can be transmitted and expansion and contraction can be made. The steering shaft 5 is rotatable supported to an inner diameter side of the steering column 6. The steering wheel 1 is fixed to a part of the upper shaft 14 protruding from a rear end opening of the outer column 12. A front end portion of the inner column 11 is joined and fixed with a housing 15, and a front half part of the lower shaft 13 is inserted in the housing 15.

An output shaft 16 is rotatably supported to a front side of the lower shaft 13 in the housing 15 by a pair of ball bearings 17, 18. A part of the output shaft 16 protruding from a front end opening of the housing 15 is joined with the universal joint 7. The output shaft 16 and the lower shaft 13 are coaxially coupled to each other via a torsion bar 19.

The torsion bar 19 is formed of spring steel and has a first coupling shaft part 20 and a second coupling shaft part 21 provided at both axial end portions, a spring shaft part 22 provided at an axially intermediate part, and a guide shaft part 23 provided between the first coupling shaft part 20 and the spring shaft part 22 and having a diameter larger than the spring shaft part 22. In a state where most of the torsion bar 19 except the rear end portion is arranged at an inner diameter side of the output shaft 16, the first coupling shaft part 20 is spline-fitted into a spline hole 24 formed in a radially central portion of front end side portion of the lower shaft 13 so as not to be relatively rotatable. The second coupling shaft part 21 is loosely fitted in a fitting hole 25 formed in a front end portion of the output shaft 16 and is then joined to the front end portion of the output shaft 16 so as not to be relatively rotatable by a pin 26 engaged thereto. A bush 27 is internally fitted and fixed to a rear end portion of an inner peripheral surface of the output shaft 16, and a guide shaft part 23 is supported to an inner diameter side thereof so as to be relatively rotatable.

A front end portion of the lower shaft 13 is provided with a cylindrical part 28. An inner peripheral surface of the cylindrical part 28 is provided with a female stopper part 29 having a circumferential concave-convex shape (gear wheel shape) where a diameter of an inscribed circle thereof is larger than the spline hole 24. In the meantime, a rear end portion of an outer peripheral surface of the output shaft 16 is provided with a male stopper part 30 having a circumferential concave-convex shape and an outer diameter dimension smaller than a rear end side portion thereof. The female stopper part 29 and the male stopper part 30 are concavity/convexity engaged with each other so as to be relatively rotatable within a predetermined angle range.

A rear end side portion, which is a portion adjacent to a front side of the male stopper part 30 in the axial direction, of the outer peripheral surface of the output shaft 16 is provided with a torque detection concave-convex part 31 having a circumferential concave-convex shape where a diameter of a circumscribed circle thereof is larger than the male stopper part 30. A cylindrical torque detection sleeve 32 formed of non-magnetic metal is arranged at an outer diameter side of the torque detection concave-convex part 31. A base end portion (rear end portion) of the torque detection sleeve 32 is externally fitted and fixed to the cylindrical part 28. A part ranging from a front end portion to an intermediate portion, which is arranged at the outer diameter side of the torque detection concave-convex part 31, of the torque detection sleeve 32 is formed with a plurality of substantially rectangular window holes 33, 33 arranged axially in a double-row and equally spaced in the circumferential direction. A torque detection coil unit 34 internally fitted and fixed to the housing 15 is arranged at an outer diameter side of the torque detection concave-convex part 31 and the torque detection sleeve 32.

A worm wheel 35 is externally fitted and fixed to an axially intermediate part of the output shaft 16. A worm 36 rotatably supported in the housing 15 is meshed with the worm wheel 35. An electric motor 10 is supported and fixed to the housing 15, and a motor output shaft 37 of the electric motor 10 is joined to a base end portion of the worm 36 such that torque can be transmitted.

According to the electric power steering device configured as described above, when a driver operates the steering wheel 1 to apply torque, which is a steering force, to the steering shaft 5, the torsion bar 19 is elastically distorted in correspondence to a direction and a magnitude of the torque. Accompanied by this, a circumferentially positional relation between the torque detection concave-convex part 31 and the torque detection sleeve 32 is changed, so that an impedance change occurs in a coil of the torque detection coil unit 34. Accordingly, it is possible to detect the direction and magnitude of the torque based on the impedance change. The electric motor 10 is configured to generate auxiliary power in correspondence to a detection result of the torque. The auxiliary power is increased by a worm reducer 38 configured by the worm wheel 35 and the worm 36 meshed with each other and is then applied to the output shaft 16. As a result, a force that is necessary for the driver to operate the steering wheel 1 is reduced.

In the meantime, when the high torque (steering force) is input from the steering wheel 1 to the steering shaft 5 and thus a distortion amount of the torsion bar 19 reaches one or other upper limit of a predetermined angle range, tooth parts of the female stopper part 29 and the male stopper part 30 are meshed with each other in the circumferential direction. Based on this meshing, a part of the torque is directly transmitted from the lower shaft 13 to the output shaft 16.

In order to assemble the electric power steering device as described above, the first coupling shaft part 20 provided at the rear end portion of the torsion bar 19 is first press-fitted into the spline hole 24 formed in the front end side portion of the lower shaft 13, thereby coupling the torsion bar 19 and the lower shaft 13 each other such that the torque can be transmitted. Then, the second coupling shaft part 21 provided at the front end portion of the torsion bar 19 is inserted into an inner side of the output shaft 16 from a rear end side, and the second coupling shaft part 21 is internally fitted to the fitting hole 25 formed in the front end portion of the output shaft 16 with no interference. Then, in a state where a positional relation between the lower shaft 13 and the output shaft 16 in a rotation direction is adjusted to a center position of the predetermined angle range, a radial through-hole 39 is drilled at a position at which the front end portion of the output shaft 16 and the front end portion (the second coupling shaft part 21) of the torsion bar 19 are aligned with each other. Then, the pin 26 is press-fitted in the through-hole 39, thereby coupling the front end portion of the torsion bar 19 to the output shaft 16 such that the torque can be transmitted. Alternatively, the through-hole 39 may be formed in advance, and the pin 26 may be press-fitted in the through-hole 39.

However, when assembling the electric power steering device of the conventional structure by the assembling method as described above, following problems may be caused.

That is, as shown in FIG. 11, when inserting the second coupling shaft part 21 provided at the front end portion of the torsion bar 19 into the output shaft 16 from the rear end side and bringing the output shaft 16 and the lower shaft 13 close to each other in the axial direction, the front end portion of the torque detection sleeve 32 is advanced into the outer diameter side of the torque detection concave-convex part 31 before the guide shaft part 23 of the torsion bar 19 is advanced into an inner diameter side of the bush 27. Therefore, it is difficult to secure coaxiality of the output shaft 16 and the lower shaft 13. Also, when bringing the output shaft 16 and the lower shaft 13 close to each other in the axial direction, attention should be taken such that the torque detection sleeve 32 and the torque detection concave-convex part 31 are not to contact each other. Therefore, the assembling operability is lowered, and there is room for improvement.

PRIOR ART DOCUMENT

Patent Document

Patent Document 1: JP-A-2013-71590

SUMMARY OF THE INVENTION

Problems to be Solved

The present invention has been made in view of the above circumstance and provides an electric power steering device capable of preventing a torque detection sleeve and a torque detection concave-convex part from contacting each other upon assembling and improving an assembling operability, and a method for assembling the same.

Means for Solving Problems

An electric power steering device of an embodiment includes an input shaft, an output shaft, a torsion bar, a female stopper part, a male stopper part, a torque detection concave-convex part, a torque detection sleeve, and a bush.

The input shaft is applied with a steering force from a steering wheel.

The output shaft is coaxially arranged with the input shaft and is applied with auxiliary power from an electric motor as a generation source.

The torsion bar includes a first coupling shaft part and a second coupling shaft part which are provided at both axial end portions, a spring shaft part which is provided at an axially intermediate part, and a guide shaft part which is provided between the first coupling shaft part and the spring shaft part and has a diameter larger than the spring shaft part. In a state where the torsion bar is arranged at an inner diameter side of the input shaft and the output shaft, the first coupling shaft part is coupled to one rotary shaft which is one of the input shaft and the output shaft and the second coupling shaft part is coupled to the other rotary shaft which is the other of the input shaft and the output shaft such that torque can be transmitted, respectively.

The female stopper part is provided at one axial end portion of the one rotary shaft, which is an end portion at a side of the other rotary shaft in an axial direction. The female stopper part may be configured by a plurality of axially long female-side tooth parts and female-side grooves arranged alternately and equally spaced in a circumferential direction.

The male stopper part is provided at another axial end portion of an outer peripheral surface of the other rotary shaft, which is an end portion at a side of the one rotary shaft in the axial direction. The male stopper part is configured to be engaged (for example, concavity/convexity engaged) with the female stopper part to be relatively rotatable within a predetermined angle range. The male stopper part may be configured by a plurality of axially long male-side tooth parts and male-side grooves arranged alternately and equally spaced in the circumferential direction.

The torque detection concave-convex part is provided at a portion, which is adjacent to one axial side of the male stopper part, of the outer peripheral surface of the other rotary shaft. The torque detection concave-convex part may be configured such that a diameter of a circumscribed circle thereof is larger than a diameter of a circumscribed circle of the male stopper part.

The torque detection sleeve is arranged at an outer diameter side of the torque detection concave-convex part and includes another axial end portion which is a base end portion and is externally fitted and fixed to one axial end portion of the one rotary shaft.

The bush is internally fitted and fixed (press-fitted) to another axial end portion of an inner peripheral surface of the other rotary shaft and is configured to support the guide shaft part to an inner diameter side thereof so as to be relatively rotatable.

Particularly, in the electric power steering device, an axial distance from another axial end portion of the bush to another axial end portion of the torque detection concave-convex part is made greater than an axial distance from one axial end portion of the guide shaft part to one axial end portion of the torque detection sleeve.

In the electric power steering device, for example, an axial distance (α) from one axial end portion of the guide shaft part to one axial end portion of the second coupling shaft part is preferably greater than an axial distance (β) from the other axial end portion of the bush to another axial end portion of a fitting hole formed in one axial end portion of the other rotary shaft.

A method of assembling an electric power steering device according to another embodiment of the present invention includes inserting the second coupling shaft part of the torsion bar into an inner side of the other rotary shaft from another axial end side in a state where the first coupling shaft part of the torsion bar is coupled to the one rotary shaft and the other axial end portion of the torque detection sleeve is externally fitted and fixed to one axial end portion of the one rotary shaft, and advancing (inserting) one axial end portion of the guide shaft part into an inner diameter side of other axial end portion of the bush before advancing one axial end portion of the torque detection sleeve into the outer diameter side of the torque detection concave-convex part when bringing the one rotary shaft and the other rotary shaft close to each other in the axial direction.

In other words, when bringing the one rotary shaft and the other rotary shaft close to each other in the axial direction, an axial distance between the other axial end portion of the torque detection concave-convex part and one axial end portion of the torque detection sleeve is made greater than an axial distance between the other axial end portion of the bush and one axial end portion of the guide shaft part.

In the above assembling method, for example, the second coupling shaft part is preferably internally fitted to a fitting hole formed in one axial end portion of the other rotary shaft with no interference before advancing one axial end portion of the guide shaft part into an inner diameter side of the other axial end portion of the bush.

Effects of the Invention

According to the above configuration, it is possible to prevent the torque detection sleeve and the torque detection concave-convex part from contacting each other upon the assembling, so that it is possible to improve the assembling operability.

That is, in a completion state (assembling completed state) of the electric power steering device, the axial distance from the other axial end portion of the bush to the other axial end portion of the torque detection concave-convex part is larger than the axial distance from one axial end portion of the guide shaft part to one axial end portion of the torque detection sleeve.

For this reason, upon the assembling, in a state where the first coupling shaft part of the torsion bar is coupled to one rotary shaft of the input shaft and the output shaft arranged coaxially and the base end portion of the torque detection sleeve is externally fitted and fixed to the one rotary shaft, when inserting the second coupling shaft part of the torsion bar into the inner side of the other rotary shaft from the other axial end side and bringing the one rotary shaft and the other rotary shaft close to each other in the axial direction, it is possible to advance one axial end portion of the guide shaft part into the inner diameter side of the other axial end portion of the bush before one axial end portion of the torque detection sleeve is advanced into the outer diameter side of the torque detection concave-convex part.

Therefore, in a state where the coaxiality of the input shaft and the output shaft is secured by the torsion bar and the bush, it is possible to advance the torque detection sleeve into the outer diameter side of the torque detection concave-convex part.

As a result, it is possible to effectively prevent the torque detection sleeve and the torque detection concave-convex part from contacting each other. Thereby, it is possible to improve the assembling operability of the electric power steering device.

Also, according to the preferred embodiment, it is possible to internally fit the second coupling shaft part into the fitting hole formed in one axial end portion of the other rotary shaft with no interference before one axial end portion of the guide shaft part is advanced into the inner diameter side of the other axial end portion of the bush. Therefore, it is possible to secure the coaxiality of the input shaft and the output shaft to a certain degree by the fitting part between the second coupling shaft part and the fitting hole of the other rotary shaft. Accordingly, it is possible to smoothly advance one axial end portion of the guide shaft part into the inner diameter side of the other axial end portion of the bush.

DETAILED DESCRIPTION OF EMBODIMENTS

Example of Embodiment

Figure 1:
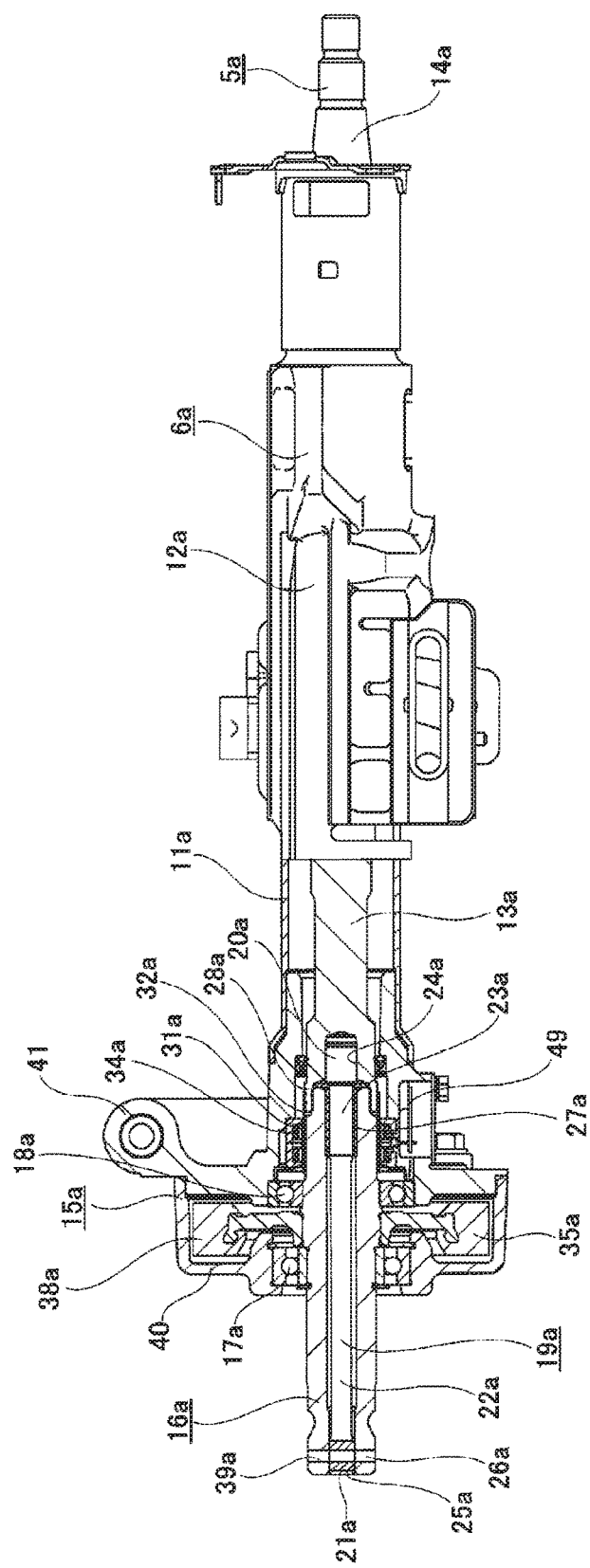
FIG. 1 is a partial cut side view illustrating an example of an embodiment.
Figure 2:
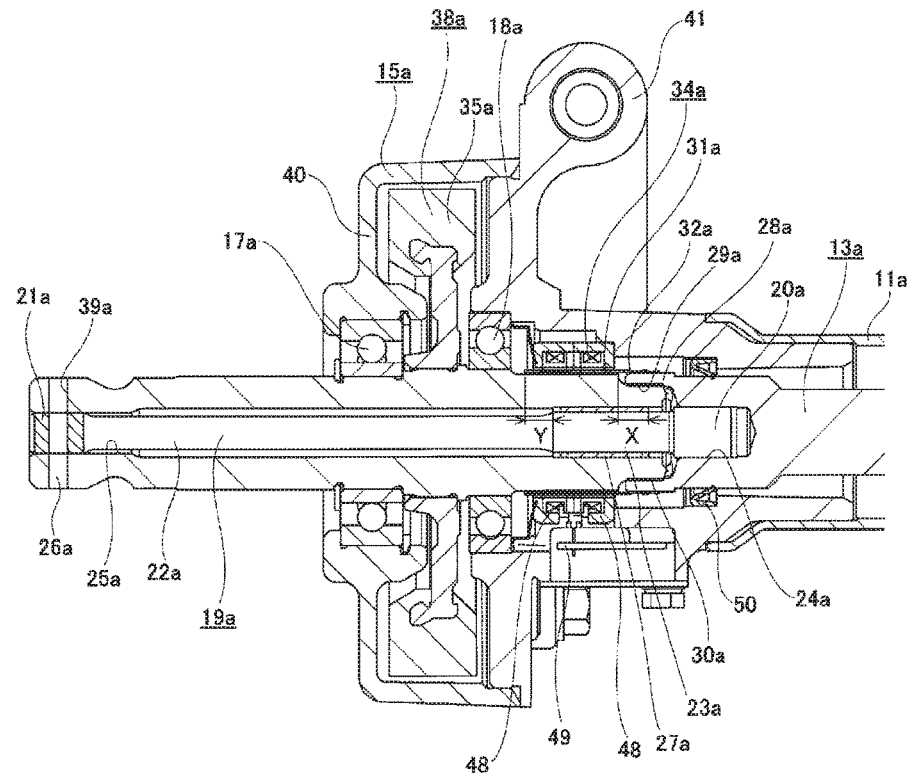
FIG. 2 is an enlarged view of a left end part of FIG. 1.

An example of an embodiment of the present invention will be described with reference to FIGS. 1 to 7. An electric power steering device of the example includes a steering column 6a, a steering shaft 5a, a housing 15a, an output shaft 16a, a torsion bar 19a, a bush 27a, a torque detection sleeve 32a, a torque detection coil unit 34a, a substrate 49, an electric motor 10 (refer to FIG. 8), and a worm reducer 38a.

The steering column 6a is configured by a cylindrical inner column 11a arranged at a front side and a cylindrical outer column 12a arranged at a rear side, which are combined to be expandable and contractible and are respectively formed of steel or light alloy such as aluminum alloy, and is supported to a vehicle body by a support bracket (not shown).

The steering shaft 5a is configured by spline fitting a lower shaft 13a arranged at a front side and formed of steel and an upper shaft 14a having a hollow shaft shape, arranged at a rear side and formed of steel such that torque can be transmitted and expansion and contraction can be made, and is rotatably supported to an inner diameter side of the steering column 6a. The steering wheel 1 (refer to FIG. 8) is fixed to a part (rear end portion) of the upper shaft 14a protruding from a rear end opening of the outer column 12a. In this example, the lower shaft 13a corresponds to an input shaft in the claims.

The housing 15a is configured by a front cover body 34 and a rear main body 35, which are respectively formed of light alloy such as aluminum alloy or synthetic resin and are joined with each other by a plurality of bolts, and is joined and fixed to a front end portion of the inner column 11a. A front end portion of the lower shaft 13a is inserted in the housing 15a.

The output shaft 16a is formed to have a hollow shaft shape by steel, which is magnetic metal, and is rotatably supported to a front side of the lower shaft 13a in the housing 15a by a pair of ball bearings 17a, 18a. The universal joint 7 (refer to FIG. 8) is joined to a front end portion of the output shaft 16a protruding from a front end opening of the housing 15a.

The torsion bar 19a is formed of steel such as spring steel, and has a rear end portion, which is a first coupling shaft part (input side coupling part) 20a, a front end portion, which is a second coupling shaft part (output side coupling shaft part) 21a, an axially intermediate part, which is a spring shaft part 22a, and a part between the first coupling shaft part 20a and the spring shaft part 22a, which is a guide shaft part 23a having an outer diameter dimension larger than an outer diameter of the spring shaft part 22a. The torsion bar 19a has an entire length longer than the output shaft 16a, and in a state where most of the torsion bar except the first coupling shaft part 20a, which is the rear end portion, is arranged at an inner diameter side of the output shaft 16a, the first coupling shaft part 20a is spline-fitted to a spline hole 24a, which is formed in a radially central portion of a front end side portion of the lower shaft 13a, so as not to be relatively rotatable. The second coupling shaft part 21a, which is the front end portion, is loosely internally fitted (cylindrical surface fitted) in a fitting hole 25a formed in the front end portion of the output shaft 16a with no interference and is joined to the front end portion of the output shaft 16a so as not to be relatively rotatable by a pin 26a directly radially engaged therein. That is, in this example, the lower shaft 13a corresponds to one rotary shaft in the claims, and the output shaft 16a corresponds to the other rotary shaft in the claims. The front end portion corresponds to one axial end portion in the claims, and the rear end portion corresponds to the other axial end portion in the claims.

Outer diameter dimensions (diameter of a circumscribed circle) of the first and second coupling shaft parts 20a, 21a are larger than outer diameter dimensions of the spring shaft part 22a and the guide shaft part 23a, and the outer diameter dimension of the guide shaft part 23a is larger than the outer diameter dimension of the spring shaft part 22a, While the guide shaft part 23a has an outer peripheral surface that is a simple cylindrical surface over an entire axial length, the spring shaft part 22a has such an outer peripheral surface that an axially intermediate part is a simple cylindrical surface and both axial end portions are formed as inclined surfaces of which outer diameter dimensions increase toward both axial sides.

The bush 27a is formed of synthetic resin or metal, has a notched cylindrical shape (C-shaped section) or a cylindrical shape, as a whole, and is internally fitted and fixed (press-fitted and fixed) to a rear end portion of an inner peripheral surface of the output shaft 16a. The bush 27a is configured to support (pivotally support) the guide shaft part 23a configuring the torsion bar 19a to an inner diameter side thereof so as to be relatively rotatable.

The front end portion of the lower shaft 13a is provided with a cylindrical part 28a. An inner peripheral surface of the cylindrical part 28a is provided with a female stopper part 29a having a circumferential concave-convex shape (gear wheel shape) where a diameter of an inscribed circle thereof is larger than the spline hole 24a. The female stopper part 29a is formed by arranging a plurality of axially long female-side tooth parts 43, 43 and female-side grooves 44, 44 alternately and with equal pitches in a circumferential direction on the inner peripheral surface of the cylindrical part 28a.

In the meantime, a rear end portion of an outer peripheral surface of the output shaft 16a is provided with a male stopper part 30a having a circumferential concave-convex shape (gear wheel shape) where an outer diameter dimension (diameter of a circumscribed circle) thereof is smaller than a rear end side portion (a torque detection concave-convex part 31a (which will be described later), which is a portion adjacent to the front side with respect to the axial direction). The male stopper part 30a is formed by arranging a plurality of axially long male-side tooth parts 45, 45 and male-side grooves 46, 46 alternately and with equal pitches in the circumferential direction at the rear end portion of the outer peripheral surface of the output shaft 16a. The number of the male-side tooth parts 45, 45 (the male-side grooves 46, 46) is the same as the number of the female-side tooth parts 43, 43 (the female-side grooves 44, 44).

The female stopper part 29a and the male stopper part 30a are concavity/convexity engaged with each other so as to be relatively rotatable (such as loose spline engagement) within a predetermined angle range (for example, a range of ±5° with respect to a neutral state in which the torsion bar 19a is not distorted). That is, each of the female-side tooth parts 43, 43 (each of the male-side tooth parts 45, 45) is loosely engaged to each of the male-side grooves 46, 46 (each of the female-side grooves 44, 44) with a circumferential gap, so that relative rotation between the lower shaft 13a and the output shaft 16a is restrained to the predetermined angle range. Accordingly, the torsion bar 19a is prevented from being excessively distorted.

A torque detection concave-convex part 31a having a concavo-convex shape (gear wheel shape) in the circumferential direction where a diameter of a circumscribed circle thereof is larger than the male stopper part 30a is formed at a rear end side portion, which is a portion adjacent to the front end side of the male stopper part 30a in the axial direction, of the outer peripheral surface of the output shaft 16a. The torque detection concave-convex part 31a is configured by a plurality of axially long detection grooves 47, 47 equally spaced in the circumferential direction at the rear end side portion of the outer peripheral surface of the output shaft 16a. In this example, the number of the detection grooves 47, 47 is the same as the number of the male-side grooves 44, 44. Each of the detection grooves 47, 47 and each of the male-side grooves 44, 44 are provided to be axially continuous. That is, circumferential phases of each of the detection grooves 47, 47 and each of the male-side grooves 44, 44 are the same.

The torque detection sleeve 32a is formed to have a cylindrical shape by non-magnetic metal having conductivity such as aluminum alloy, and is concentrically arranged at an outer diameter side of the torque detection concave-convex part 31a. A base end portion (rear end portion) of the torque detection sleeve 32a is externally fitted and fixed to the cylindrical part 28a. A part ranging from a front end portion (leading end portion) to an intermediate portion, which is arranged at the outer diameter side of the torque detection concave-convex part 31a, of the torque detection sleeve 32a is formed with a plurality of substantially rectangular window holes 33a, 33a arranged axially in a double-row and equally spaced in the circumferential direction. Circumferential phases of the window holes 33a, 33a of both rows are offset each other by a half pitch. An inner diameter dimension of the part, which is arranged at the outer diameter side of the torque detection concave-convex part 31a, of the torque detection sleeve 32a is larger than the diameter (outer diameter dimension) of the circumscribed circle of the torque detection concave-convex part 31a by about 0.5 mm.

Particularly, in this example, a mounting positon (press-fitting position) of the bush 27a and a formation position of the torque detection concave-convex part 31a based on a rear end portion (rear end edge portion) of the output shaft 16a are respectively regulated, and an entire length (axial length) of the guide shaft part 23a configuring the torsion bar 19a and an entire length (and a mounting position) of the torque detection sleeve 32a are respectively regulated, so that an axial distance X from a rear end portion of the bush 27a to a rear end portion of the torque detection concave-convex part 31a is made greater than an axial distance Y from a front end portion of the guide shaft part 23a to a front end portion of the torque detection sleeve 32a (X>Y).

The torque detection coil unit 34a has a cylindrical shape and is concentrically arranged at an outer diameter side of the torque detection concave-convex part 31a and the torque detection sleeve 32a. The torque detection coil unit 34a is internally fitted and fixed to the housing 15a, and has a pair of coils 48, 48. Both the coils 48, 48 are arranged to radially overlap with portions, at which the window holes 33a, 33a of the two rows are provided, of the torque detection sleeve 32a.

The substrate 49 is provided below the torque detection coil unit 34a in the housing 15a. A motor control circuit is configured on the substrate 49. End portions of both the coils 48, 48 are connected to the motor control circuit.

The worm reducer 38a is configured by a combination of a worm wheel 35a and a worm (not shown). The worm wheel 35a is externally fitted and fixed to an axial part, which is between both the ball bearings 17a, 18a, of the output shaft 16a. Also, the worm is rotatably supported in the housing 15a with being meshed with the worm Wheel 35a.

The electric motor 10 (refer to FIG. 8) is supported and fixed to the housing 15a. A motor output shaft of the electric motor 10 is joined to a base end portion of the worm such that torque can be transmitted.

In the illustrated structure, a portion between a rear end side portion of an outer peripheral surface of the lower shaft 13a and an inner surface of the housing 15a is mounted with a seal ring 50 for preventing lubricant in the housing 15a from flowing out to a space of the inner diameter side of the steering column 6a.

According to the electric power steering device configured as described above, when a driver operates the steering wheel 1 to apply torque, which is a steering force, to the steering shaft 5a, the torsion bar 19a is elastically distorted (within the predetermined angle range) in correspondence to a direction and a magnitude of the torque. Accompanied by this, a circumferentially positional relation between the torque detection concave-convex part 31a and the torque detection sleeve 32a is changed, so that an impedance change occurs in the coils 48, 48 of the torque detection coil unit 34a. It is possible to detect the direction and magnitude of the torque based on the impedance change. The motor control circuit on the substrate 49 is configured to control energization of the electric motor 10 by using a detection result of the torque, thereby generating auxiliary power corresponding to the direction and magnitude of the torque by the electric motor 10. The auxiliary power is increased by the worm reducer 38a, and is then applied to the output shaft 16a. As a result, a force that is necessary for the driver to operate the steering wheel 1 is reduced.

In the meantime, when the high torque is input from the steering wheel 1 to the steering shaft 5a and thus a distortion amount of the torsion bar 19a reaches one or other upper limit of the predetermined angle range, the female stopper part 29a and the male stopper part 30a are meshed with each other in the circumferential direction. Based on the meshing, a part of the torque is directly transmitted from the lower shaft 13a to the output shaft 16a.

Subsequently, an assembling sequence of the electric power steering device of the example configured as described above is described.

Figure 3:
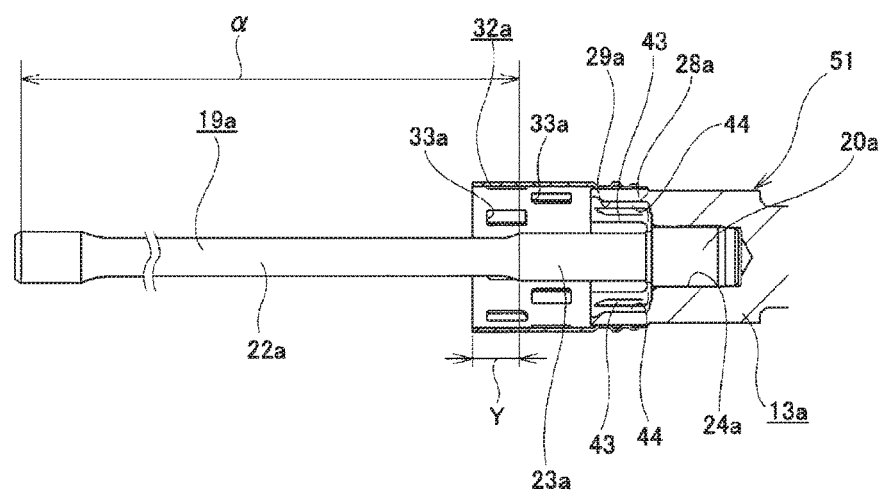
FIG. 3 is a sectional view illustrating an input-side half assembly in which a lower shaft, a torsion bar and a torque detection sleeve are assembled.
Figure 4:
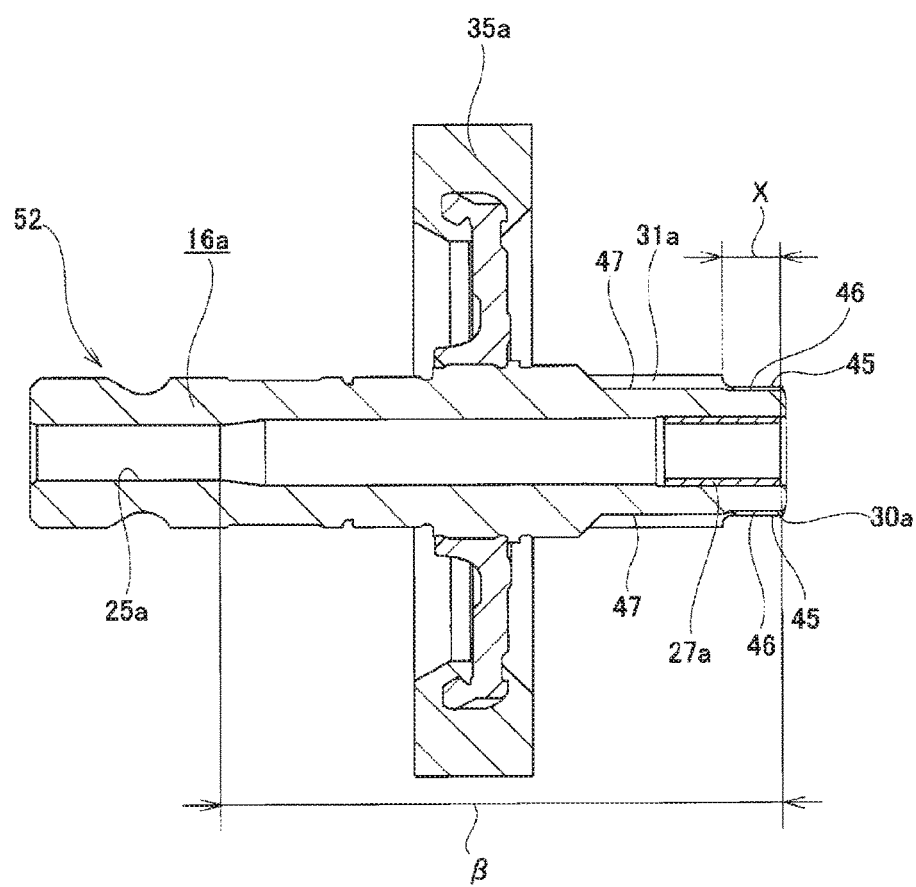
FIG. 4 is a sectional view illustrating an output-side half assembly in which an output shaft and a worm wheel are assembled.

First, as shown in FIG. 3, the first coupling shaft part 20a provided at the rear end portion of the torsion bar 19a is press-fitted into the spline hole 24a formed in a front end side portion of the lower shaft 13a, and the lower shaft 13a and the torsion bar 19a are coupled such that the torque can be transmitted. Before or after this process, the base end portion of the torque detection sleeve 32a is externally fitted and fixed to the cylindrical part 28a provided at the front end portion of the lower shaft 13a. Thereby, an input-side half assembly 51 as shown in FIG. 3 is obtained. As shown in FIG. 4, the worm wheel 35a is externally fitted and fixed to an outer peripheral surface of an axially intermediate part of the output shaft 16a, so that an output-side half assembly 52 is obtained.

Figure 5:
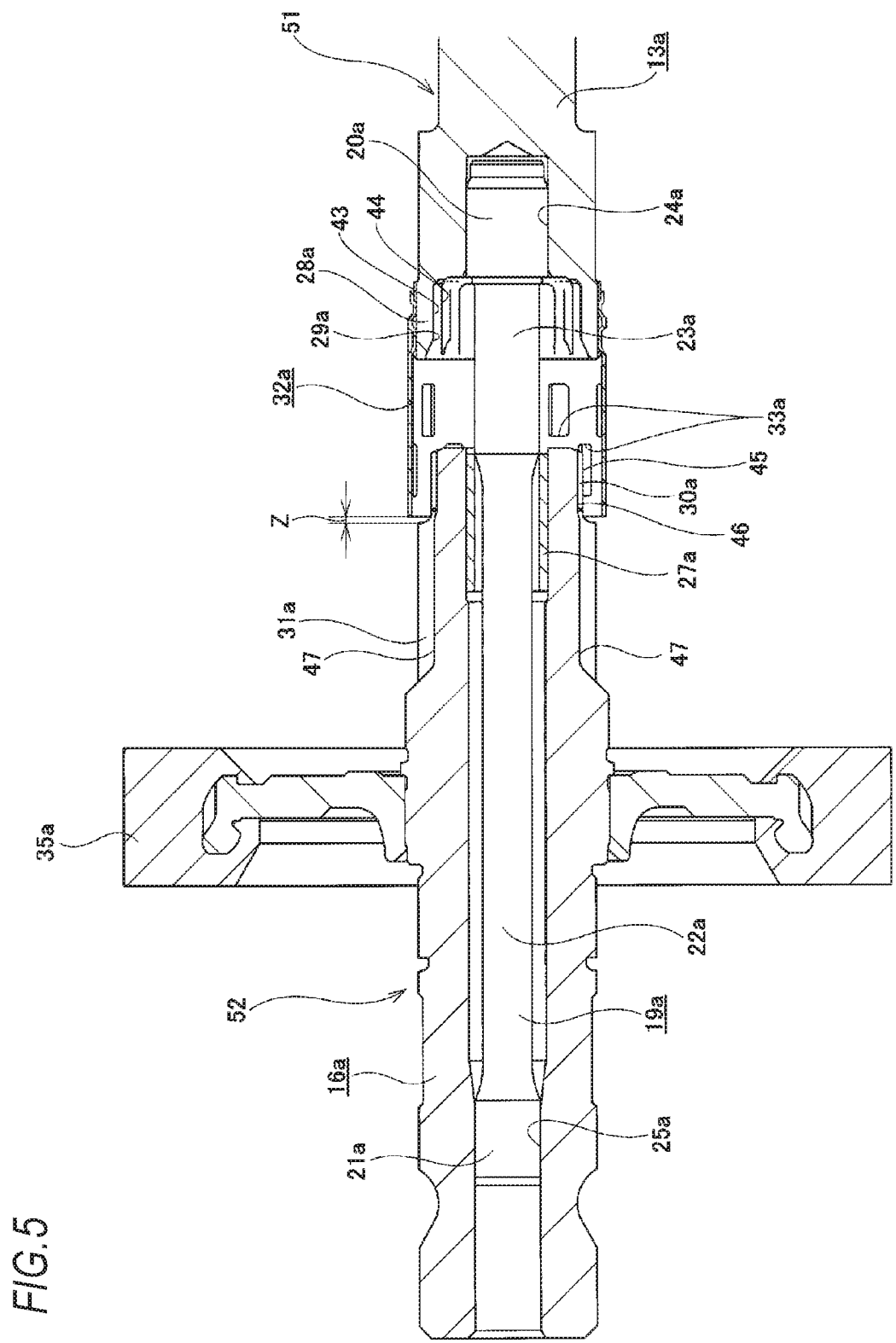
FIG. 5 is a sectional view illustrating a state where the input-side half assembly and the output-side half assembly are being combined.
Figure 6:
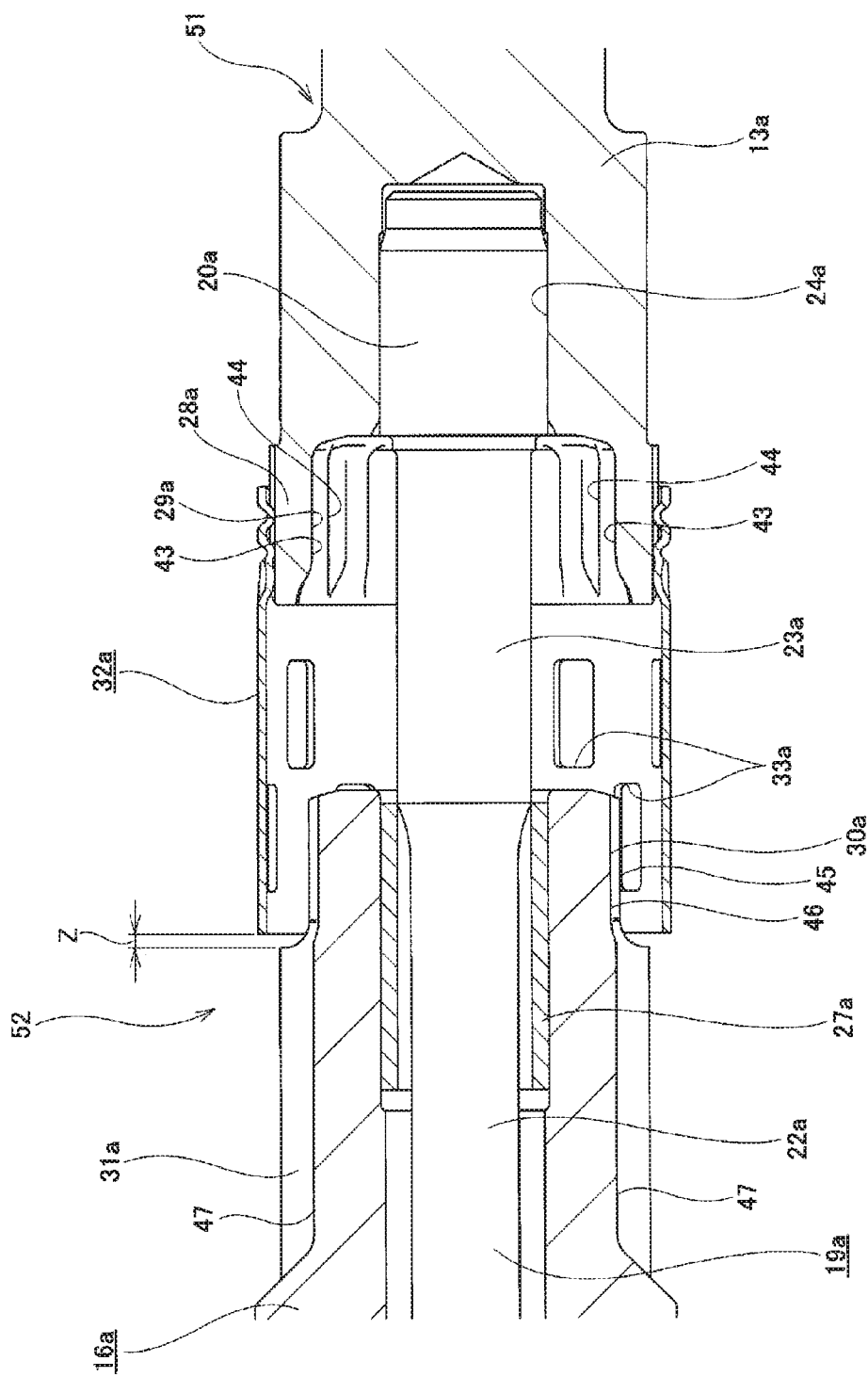
FIG. 6 is an enlarged view of a right half part of FIG. 5.
Figure 7:
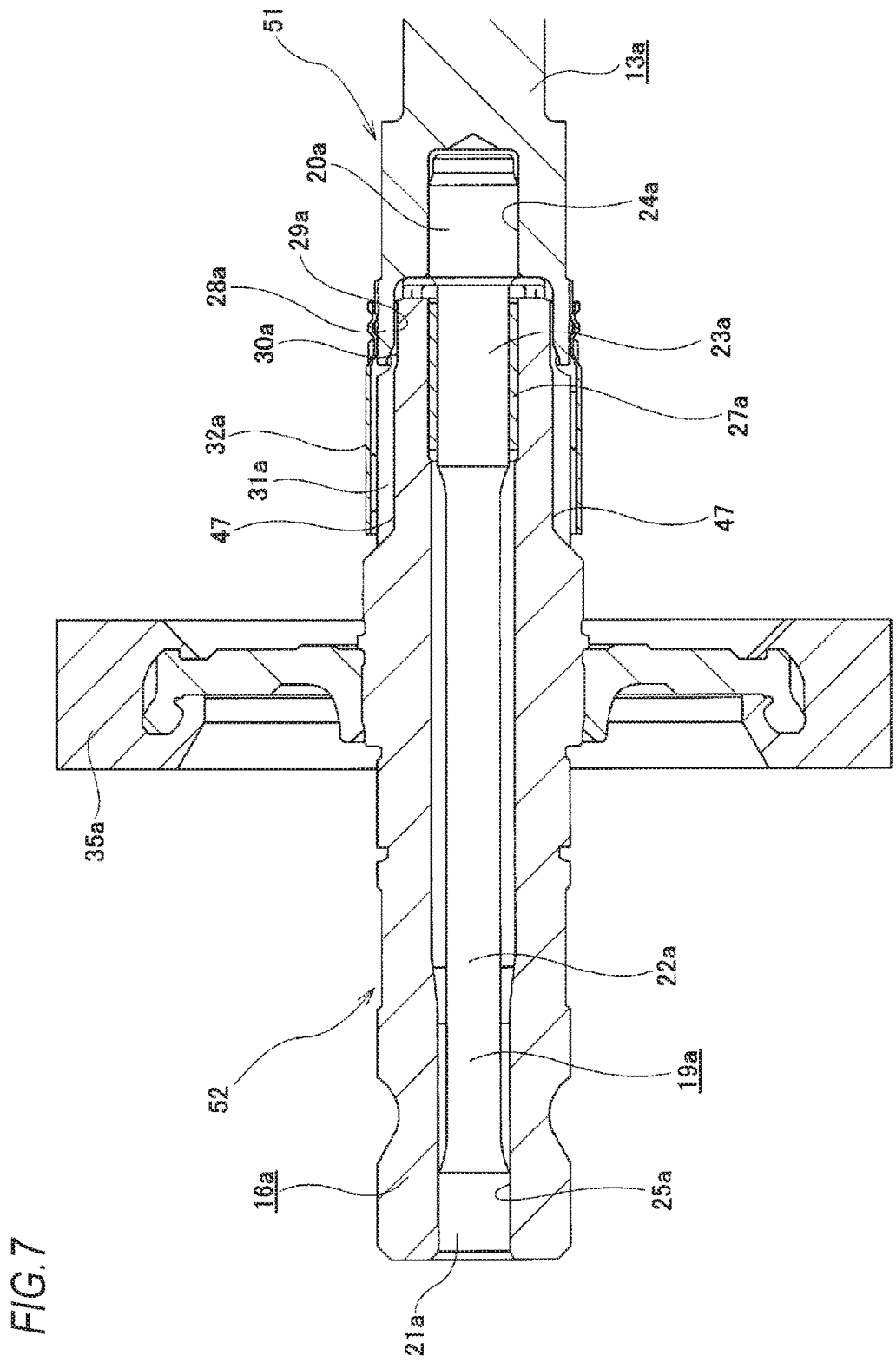
FIG. 7 is a sectional view illustrating a combination completed state of the input-side half assembly and the output-side half assembly.
Figure 8:
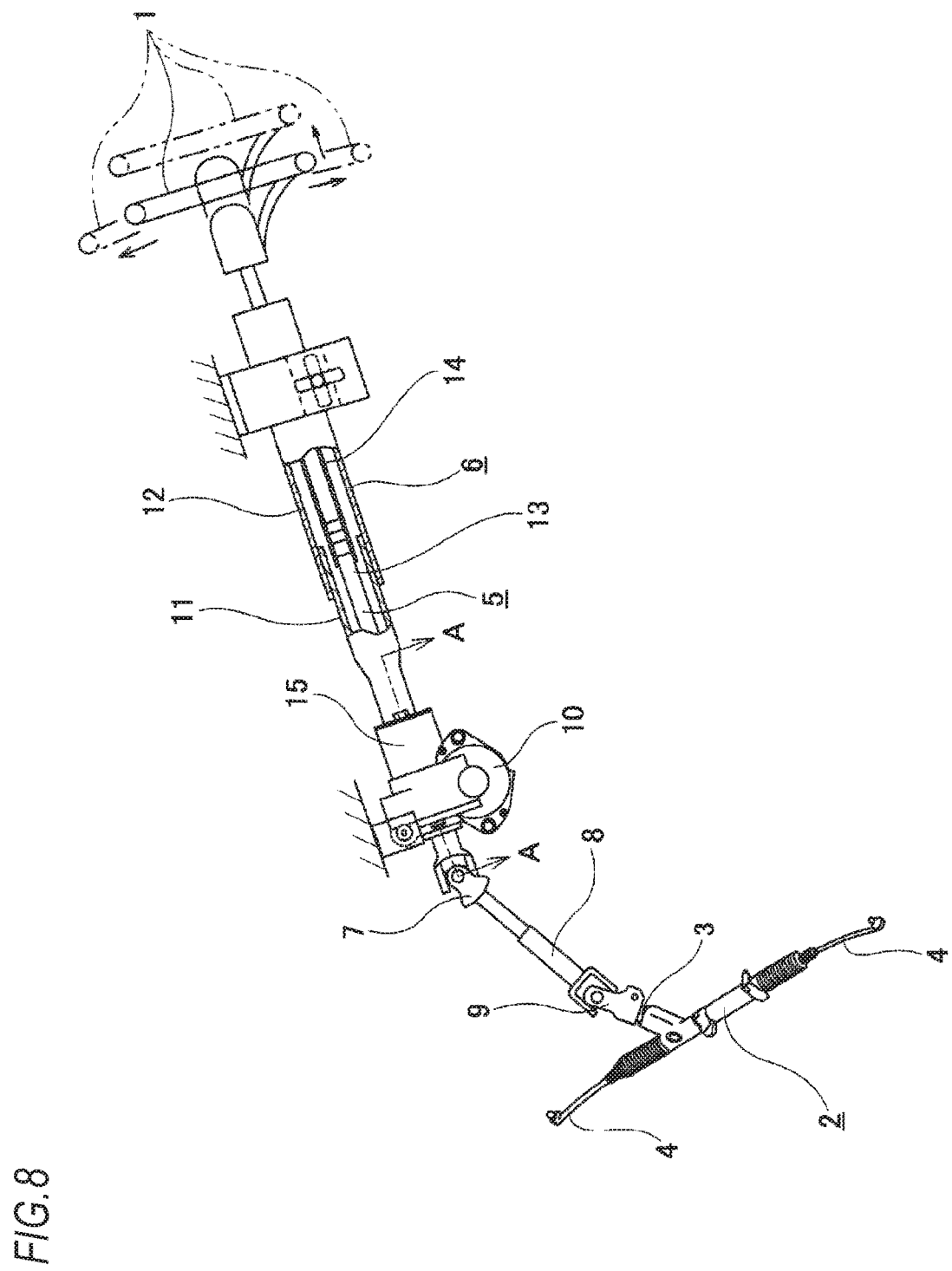
FIG. 8 is a partial cut side view illustrating an example of an electric power steering device.
Figure 9:
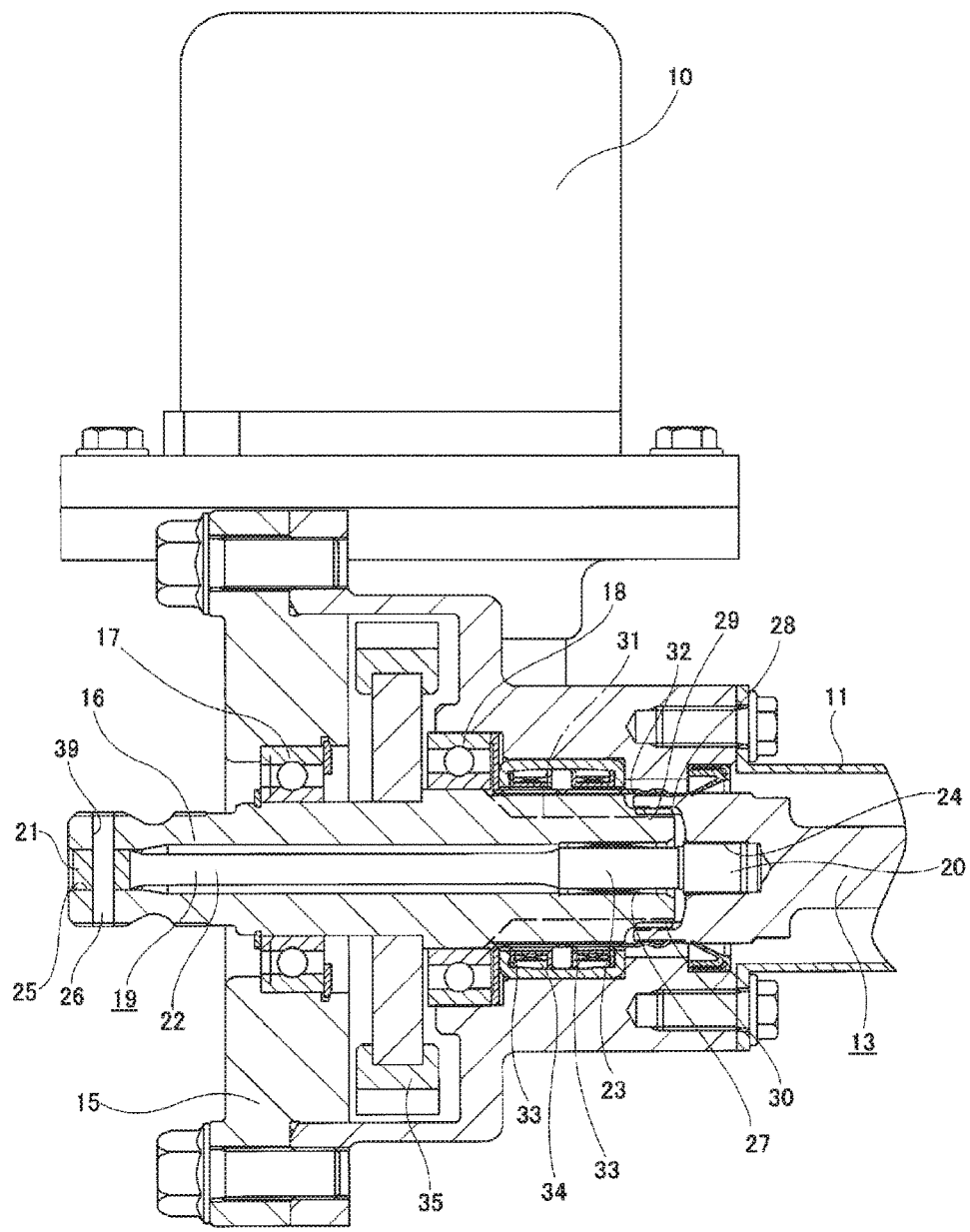
FIG. 9 is a sectional view taken along a line A-A of FIG. 8.
Figure 10:
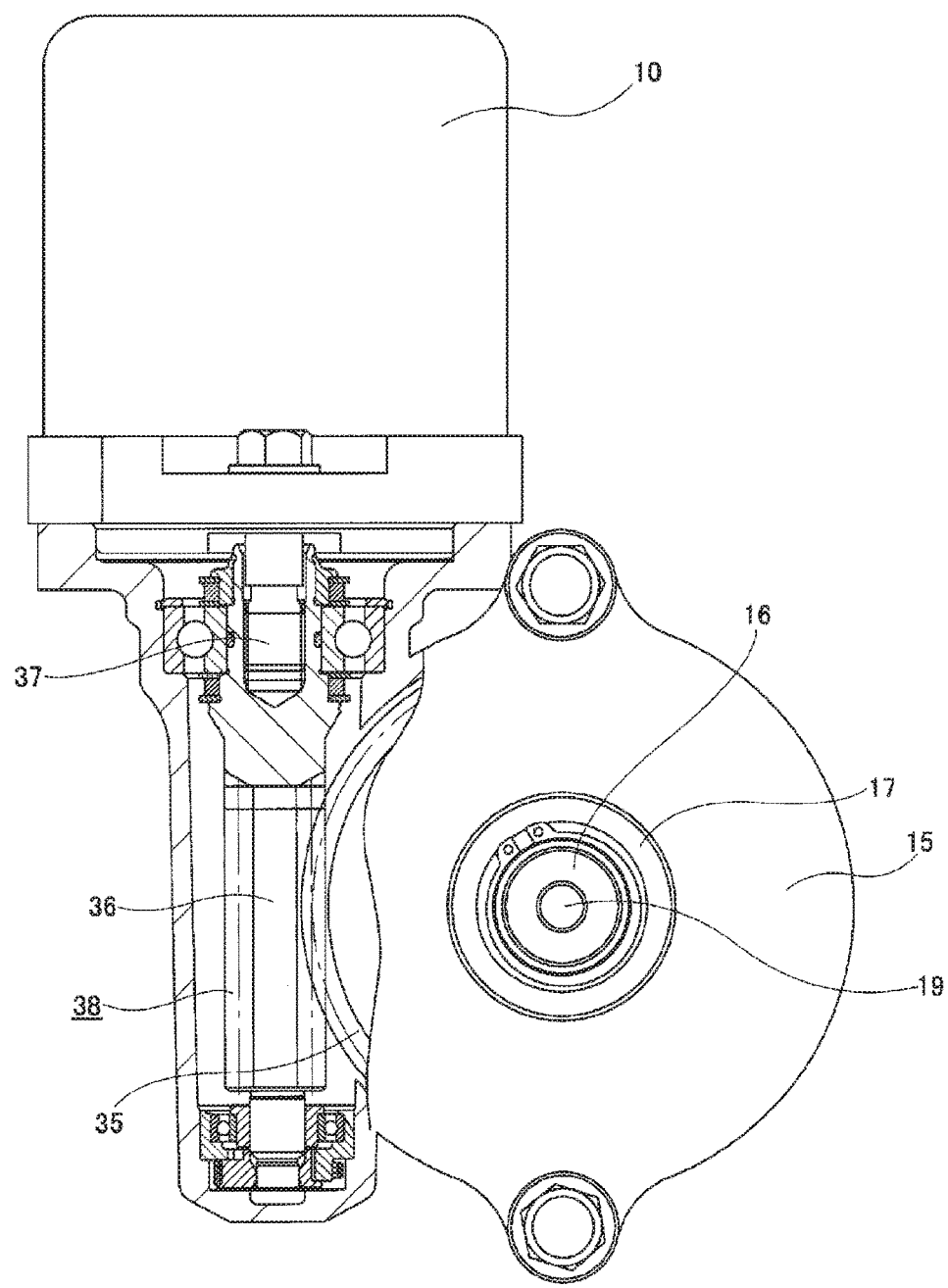
FIG. 10 is a partial cut view illustrating a state, as seen from a left side of FIG. 9.
Figure 11:
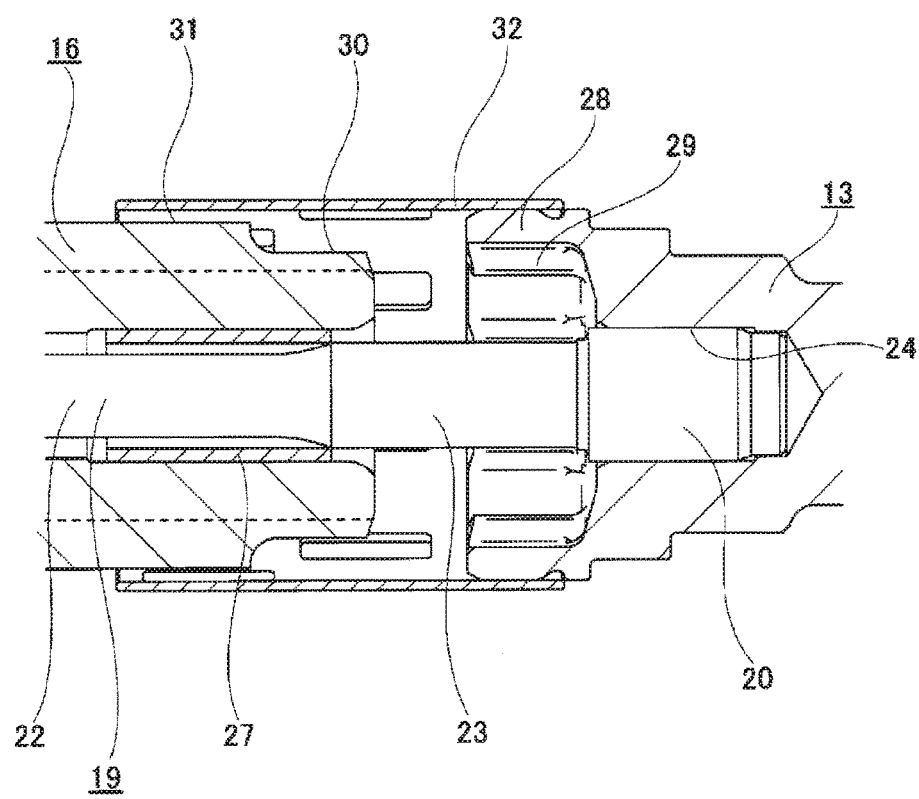
FIG. 11 is a sectional view illustrating a state where a conventional electric power steering device is being assembled.

Then, as shown in FIGS. 5 to 7, the input-side half assembly 51 and the output-side half assembly 52 are combined. That is, the second coupling shaft part 21a of the torsion bar 19a configuring the input-side half assembly 51 is inserted into an inner side of the output shaft 16a configuring the output-side half assembly 52 from a rear end side, and the input-side half assembly 51 (the lower shaft 13a) and the output-side half assembly 52 (the output shaft 16a) are brought close to each other in the axial direction. Then, in this example, first, the second coupling shaft part 21a is loosely internally fitted (cylindrical surface fitted) in the fitting hole 25a formed in the front end portion of the output shaft 16a with no interference. That is, as described later, the second coupling shaft part 21a is loosely internally fitted in the fitting hole 25a before the front end portion of the guide shaft part 23a is advanced into an inner diameter side of the rear end portion of the bush 27a. To this end, in this example, the mounting positon (press-fitting position) of the bush 27a and a formation position of fitting hole 25a are regulated, and entire lengths of the second coupling shaft part 21a and the guide shaft part 23a are respectively regulated. Specifically, an axial distance α (refer to FIG. 3)

from the front end portion of the guide shaft part 23a to a front end portion of the second coupling shaft part 21a is made greater than an axial distance β (refer to FIG. 4) from the rear end portion of the bush 27a to a rear end portion of the fitting hole 25a (α>β).

Then, the input-side half assembly 51 and the output-side half assembly 52 are brought closer to each other with the second coupling shaft part 21a being loosely internally fitted in the fitting hole 25a. Accordingly, in this example, since the axial distance X from the rear end portion of the bush 27a to the rear end portion of the torque detection concave-convex part 31a is made greater than the axial distance Y from the front end portion of the guide shaft part 23a to the front end portion of the torque detection sleeve 32a, when an axial distance between the front end portion of the guide shaft part 23a and the rear end portion of the bush 27a becomes zero (when the front end portion of the guide shaft part 23a and the rear end portion of the bush 27a are contacted to each other), as shown in FIGS. 5 and 6, a sufficiently large axial gap Z exists between the front end portion of the torque detection sleeve 32a and the rear end portion of the torque detection concave-convex part 31a. Accordingly, in this example, the front end portion of the guide shaft part 23a is advanced into the inner diameter side of the rear end portion of the bush 27 before the front end portion of the torque detection sleeve 32a is advanced into the outer diameter side of the torque detection concave-convex part 31a. Accordingly, it is possible to bring the input-side half assembly 51 and the output-side half assembly 52 close to each other in the axial direction while securing the coaxiality of the lower shaft 13a and the output shaft 16a by the torsion bar 19a and the bush 27a.

Then, as shown in FIG. 7, the input-side half assembly 51 and the output-side half assembly 52 are axially combined. Thereafter, in a state where a positional relation in the rotation direction between the lower shaft 13a and the output shaft 16a is adjusted to a center position of the predetermined angle range, a radial through-hole 39a (refer to FIGS. 1 and 2) is formed at a position, at which the front end portion of the output shaft 16a and the second coupling shaft part 21a are aligned, by drilling. Then, the pin 26a is press-fitted in the through-hole 39a, so that the second coupling shaft part 21a is coupled to the front end portion of the output shaft 16a such that the torque can be transmitted. Finally, the obtained assembly is rotatable incorporated into an inner side of the steering column 6a and the housing 15a, so that the electric power steering device of this example is obtained.

According to the electric power steering device of the example having the above-described configuration and manufactured by the above-described assembling method, it is possible to prevent the torque detection sleeve 32a and the torque detection concave-convex part 31a from contacting each other upon the assembling, so that it is possible to improve the assembling operability.

That is, according to the electric power steering device of the example, in a completion state (assembling completed state), the axial distance X from the rear end portion of the bush 27a to the rear end portion of the torque detection concave-convex part 31a is larger than the axial distance Y from the front end portion of the guide shaft part 23a to the front end portion of the torque detection sleeve 31a (X>Y). Therefore, upon the assembling, as shown in FIGS. 5 and 6, in a state when the first coupling shaft part 21a of the torsion bar 19a is coupled to the spline hole 24a of the lower shaft 13a and the base end portion of the torque detection sleeve 32a is externally fitted and fixed to the cylindrical part 28a provided to the lower shaft 13a, when inserting the second coupling shaft part 22a of the torsion bar 19a into the inner side of the output shaft 16a from the rear end side and bringing the lower shaft 13a and the output shaft 16a close to each other in the axial direction, it is possible to advance the front end portion of the guide shaft part 23a into the inner diameter side of the rear end portion of the bush 27a before the front end portion of the torque detection sleeve 32a is advanced into the outer diameter side of the torque detection concave-convex part 31a. Therefore, according to the example, in a state where the coaxiality of the input shaft 13a and the output shaft 16a is secured by the torsion bar 19a and the bush 27a, it is possible to advance the torque detection sleeve 32a into the outer diameter side of the torque detection concave-convex part 31a. As a result, according to the electric power steering device of the example, it is possible to effectively prevent the torque detection sleeve 32a and the torque detection concave-convex part 31a from contacting each other. Accordingly, it is possible to improve the assembling operability of the electric power steering device.

According to the example, it is possible to internally fit the second coupling shaft part 21a into the fitting hole 25a formed in the front end portion of the output shaft 16a with no interference before the front end portion of the guide shaft part 23a is advanced into the inner diameter side of the rear end portion of the bush 27a. Therefore, it is possible to secure the coaxiality of the lower shaft 13a and the output shaft 16a to a certain degree by the fitting part between the second coupling shaft part 21a and the fitting hole 25a (it is possible to suppress one member from being tilted relative to the other member). Accordingly, it is possible to smoothly advance the front end portion of the guide shaft part 23a into the inner diameter side of the rear end portion of the bush 27a.

INDUSTRIAL APPLICABILITY

The present invention can also be applied to a structure where the output shaft is configured as one rotary shaft and the input shaft is configured as the other rotary shaft, contrary to the embodiment. Also, when implementing the present invention, the coupling structure of the first and second coupling shaft parts provided at both end portions of the torsion bar and the input shaft and output shaft is not limited to the structure of the embodiment, and a variety of well-known structures can be adopted.

The present application is based on Japanese Patent Application No. 2015-222616 filed on Nov. 13, 2015, the contents of which are incorporated herein by reference.

DESCRIPTION OF REFERENCE NUMERALS

1: steering wheel
2: steering gear unit
3: input shaft
4: tie-rod
5, 5a: steering shaft
6, 6a: steering column
7: universal joint
8: intermediate shaft
9: universal joint
10: electric motor
11, 11a: inner column
12, 12a: outer column
13, 13a: lower shaft
14, 14a: upper shaft 15, 15a: housing
16, 16a: output shaft
17, 17a: ball bearing
18, 18a: ball bearing
19, 19a: torsion bar
20, 20a: first coupling part
21, 21a: second coupling par
22, 22a: spring shaft part
23, 23a: guide shaft part
24, 24a: spline hole
25, 25a: fitting hole
26, 26a: pin
27, 27a: bush
28, 28a: cylindrical part
29, 29a: female stopper part
30, 30a: male stopper part
31, 31a: torque detection concave-convex part
32, 32a: torque detection sleeve
33, 33a: window hole
34, 34a: torque detection coil unit
35, 35a: worm wheel
36: worm
37: motor output shaft
38, 38a: worm reducer
39: through-hole
40: cover body
41: main body
43: female-side tooth part
44: female-side groove
45: male-side tooth part
46: male-side groove
47: detection groove
48: coil
49: substrate
50: seal ring
51: input-side half assembly
52: output-side half assembly

The invention claimed is:

1. An electric power steering device comprising:
an input shaft, to which a steering force from a steering wheel is to be applied;
an output shaft which is coaxially arranged with the input shaft and to which auxiliary power from an electric motor as a generation source is to be applied;
a torsion bar which includes:
  a first coupling shaft part and a second coupling shaft part which are provided at both axial end portions thereof;
  a spring shaft part which is provided at an axially intermediate part thereof; and
  a guide shaft part which is provided between the first coupling shaft part and the spring shaft part and has a diameter larger than the spring shaft part, wherein in a state where the torsion bar is arranged at an inner diameter side of the input shaft and the output shaft, the first coupling shaft part is coupled to one rotary shaft which is one of the input shaft and the output shaft, and the second coupling shaft part is coupled to the other rotary shaft which is the other of the input shaft and the output shaft such that torque can be transmitted, respectively;
a female stopper part which is provided at one axial end portion of the one rotary shaft, which is an end portion at a side of the other rotary shaft in an axial direction;
a male stopper part which is provided at another axial end portion of an outer peripheral surface of the other rotary shaft, which is an end portion at a side of the one rotary shaft in the axial direction, the male stopper part being configured to be engaged with the female stopper part to be relatively rotatable within a predetermined angle range;
a torque detection concave-convex part which is provided at a portion, which is adjacent to one axial side of the male stopper part, of the outer peripheral surface of the other rotary shaft;
a torque detection sleeve which is arranged at an outer diameter side of the torque detection concave-convex part and includes another axial end portion which is a base end portion and is externally fitted and fixed to one axial end portion of the one rotary shaft; and
a bush which is internally fitted and fixed to another axial end portion of an inner peripheral surface of the other rotary shaft and is configured to rotatably support the guide shaft part to an inner diameter side thereof to be relatively rotatable,
wherein an axial distance from another axial end portion of the bush to another axial end portion of the torque detection concave-convex part is greater than an axial distance from one axial end portion of the guide shaft part to one axial end portion of the torque detection sleeve.

2. The electric power steering device according to claim 1,
wherein an axial distance from the one axial end portion of the guide shaft part to one axial end portion of the second coupling shaft part is greater than an axial distance from the other axial end portion of the bush to another axial end portion of a fitting hole formed in one axial end portion of the other rotary shaft.

3. An assembling method of an electric power steering device which includes an electric power steering device including:
an input shaft, to which a steering force from a steering wheel is to be applied;
an output shaft which is coaxially arranged with the input shaft and to which auxiliary power from an electric motor as a generation source is to be applied;
a torsion bar which includes:
  a first coupling shaft part and a second coupling shaft part which are provided at both axial end portions;
  a spring shaft part which is provided at an axially intermediate part; and
  a guide shaft part which is provided between the first coupling shaft part and the spring shaft part and has a diameter larger than the spring shaft part, wherein in a state where the torsion bar is arranged at an inner diameter side of the input shaft and the output shaft, the first coupling shaft part is coupled to one rotary shaft which is one of the input shaft and the output shaft, and the second coupling shaft part is coupled to the other rotary shaft which is the other of the input shaft and the output shaft such that torque can be transmitted, respectively;
a female stopper part which is provided at one axial end portion of the one rotary shaft, which is an end portion at a side of the other rotary shaft in an axial direction;
a male stopper part which is provided at another axial end portion of an outer peripheral surface of the other rotary shaft, which is an end portion at a side of the one rotary shaft in the axial direction, the male stopper part being configured to be engaged with the female stopper part to be relatively rotatable within a predetermined angle range;

a torque detection concave-convex part which is provided at a portion, which is adjacent to one axial side of the male stopper part, of the outer peripheral surface of the other rotary shaft;

a torque detection sleeve which is arranged at an outer diameter side of the torque detection concave-convex part and includes another axial end portion which is a base end portion and is externally fitted and fixed to one axial end portion of the one rotary shaft; and a bush which is internally fitted and fixed to another axial end portion of an inner peripheral surface of the other rotary shaft and is configured to rotatably support the guide shaft part to an inner diameter side thereof to be relatively rotatable, the assembling method comprising:

inserting the second coupling shaft part of the torsion bar into an inner side of the other rotary shaft from another axial end side in a state where the first coupling shaft part of the torsion bar is coupled to the one rotary shaft and the other axial end portion of the torque detection sleeve is externally fitted and fixed to the one axial end portion of the one rotary shaft; and advancing one axial end portion of the guide shaft part into an inner diameter side of another axial end portion of the bush before advancing one axial end portion of the torque detection sleeve into the outer diameter side of the torque detection concave-convex part when bringing the one rotary shaft and the other rotary shaft close to each other in the axial direction.

4. The assembling method of the electric power steering device according to claim 3, wherein the second coupling shaft part is internally fitted to a fitting hole formed in one axial end portion of the other rotary shaft with no interference before advancing one axial end portion of the guide shaft part into an inner diameter side of the other axial end portion of the bush.

* * * * *